United States Patent
Paltauf et al.

[15] 3,697,555
[45] Oct. 10, 1972

[54] ISOTHIOCYANO-DIPHENYL ETHERS, SULFIDES, SULFOXIDES AND SULFONES

[72] Inventors: Fritz Paltauf, Graz, Austria; Alfred Margot; Paul Brenneisen, both of Basel, Switzerland

[73] Assignee: Ciba-Geigy Corporation, Ardsley, N.Y.

[22] Filed: Dec. 29, 1969

[21] Appl. No.: 888,957

Related U.S. Application Data

[63] Continuation-in-part of Ser. No. 669,653, Sept. 21, 1967, Pat. No. 3,558,784, Continuation of Ser. No. 516,096, Dec. 23, 1965, abandoned.

[30] Foreign Application Priority Data

Dec. 30, 1964 Switzerland.............16868/64
Dec. 30, 1964 Switzerland.............16869/64

[52] U.S. Cl. ...............260/397.6, 260/454, 260/578, 260/576, 424/302
[51] Int. Cl............................................C07c 161/04
[58] Field of Search...........................260/397.6, 454

[56] References Cited

UNITED STATES PATENTS

| | | |
|---|---|---|
| 2,263,386 | 11/1941 | Hester.......................260/454 |
| 2,281,692 | 5/1942 | Hester et al. ..............260/454 |
| 2,937,970 | 5/1960 | Stevenson et al..........260/454 |
| 3,322,525 | 5/1967 | Martin et al..................71/2.3 |

*Primary Examiner*—Henry R. Jiles
*Assistant Examiner*—S. D. Winters
*Attorney*—Karl F. Jorda and Martin J. Spellman

[57] ABSTRACT

Anthelmintically useful mono- or di-isothiocyano substituted diphenyl ethers, sulfides, sulfoxides and sulfones, the molecule of which must contain either a dialkylamino, or, preferably, one nitro group and which optionally are further substituted by alkyl, alkoxy or chlorine are described; such compounds when applied in anthelmintically effective dosage, are unexpectedly well tolerated by the organism of warm-blooded animals, in contrast to other structurally closely related isothiocyano diphenyl ethers, which are too toxic to be satisfactory anthelmintic agents.

13 Claims, No Drawings

ISOTHIOCYANO-DIPHENYL ETHERS, SULFIDES, SULFOXIDES AND SULFONES

DESCRIPTION OF THE INVENTION.

This application is a continuation-in-part of our pending application, Ser. No.669,653, now U.S. Pat. No. 3,558,784, filed Sept. 21, 1967, as a continuation of our application, Ser. No.516,096, filed Dec. 23, 1965, now abandoned.

The present invention concerns new anthelmintically active isothiocyano derivatives as active substances, which are useful for combatting parasitic helminths and for the prevention of helminthiasis as well as other syndromes caused by the presence of helminths, and concerns also a process for the production of such compositions. These compounds according to the invention can be used either in the form of veterinary-medicinal preparations or of feed additives.

In the present description, the term "helminths" refers to nematodes, cestodes and trematodes i.e. to worms which infest the gastrointestinal tract, the liver and other organs.

Of the endoparasites which occur in farm or domestic animals, helminths are among those which cause the greatest damage to these animals. Not only do the animals attacked show retarded growth or poor increase in weight because of the insufficient utilization of feed given to them, but often injuries occur which can result in the death of the animals. It is, therefore, of great importance to develop veterinary agents and feed additives which are suitable for combatting helminths in all stages of their development and for preventing damage caused by them (helminthiasis). Up to the present, a number of substances has been recommended as anthelminthics, but they are not completely satisfactory, be it that they show only a very specific action on certain helminths or that their action is either weak if applied in toxicologically tolerable doses, or undesirable side effects appear leading to severe organic injuries, if they are applied in fully effective doses. For example, allyloxy-phenyl isothiocyanate described as an anthelmintic agent is of considerable toxicity.

It has now been found that veterinary-medicinal compositions or feed additives which contain an active ingredient pertaining to the class comprising certain mon- or di-isothiocyano substituted diphenyl ethers, sulfides, sulfoxides and sulfones, the molecule of which must contain either a dialkylamino, or, preferably, one nitro group and which, optionally are further substituted as well as veterinarily acceptable acid-addition salts derived from those of the aforesaid isothiocyano-diphenyl ethers, sulfides, sulfoxides and sulfones having a dialkylamino substituent, and an inorganic or organic acid and quaternary ammonium salts derived from the last mentioned compounds containing a dialkylamino substituent and an alkylating agent such as lower halides, and which diphenyl ethers, sulfides, sulfoxides and sulfones fall under sulfides, sulfoxides and sulfones fall under a. the formula

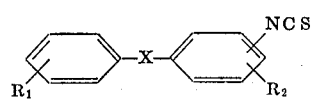

wherein
- $R_1$ is nitro or di-lower alkylamino,
- $R_2$ is hydrogen, chlorine or isothiocyano, and
- X is —O—, —S—, —SO— or —$SO_2$—;

but in more preferred compounds falling under Formula I,
- X is —O—, —S— or —SO—; and in most preferred compounds of this formula, $R_2$ is hydrogen or isothiocyano and X is —O— or —S—; or b. under the formula

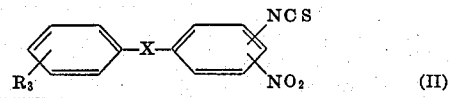

wherein
- X has the same meaning as in Formula I and
- $R_3$ is hydrogen, lower alkyl, lower alkoxy or isothiocyano, and in preferred compounds falling under Formula II
- X is —O—; are very effective against helminths, and that because of their low toxicity in warm blooded animals and good tolerance by the organism of the latter, these substances are very well suited for combatting the said endoparasites and for controlling the disturbances and symptoms caused by them. When used as ingredients of feed additives, these substances contribute to a rapid increase in weight, better utilization of the feed, and an improvement in the general state of health of the animals. Feed additives containing these compounds have, therefore, special importance for the feeding of farm and domestic animals, in particular for that of growing animals, e.g. of young pigs or cattle, in particular farrows, calves or lambs, but also horses, dogs, rodents, fur-bearing animals, fowls, chicks, pets or caged birds.

The term "lower" as used in combination with "alkyl" and "alkoxy" means that such radicals have not more than four carbon atoms, when used with "dialkylamino" such radical has at most 5 and preferably two or three carbon atoms.

The active substances of general formula I can be produced by known processes, for example by reacting correspondingly substituted aminodiphenyl ethers, sulphides, sulphoxides or sulphones e.g. in the presence of acid binding agents, with thiophosgene, at temperatures between 0° and 75° C, or with N,N-diethylthiocarbamoyl chloride at temperatures between 40° and 200° C in inert solvents or diluting agents. The reaction of amines with thiophosgene is described in Houben-Weyl, 412 Ed. Vol. 9, p. 867 (1955); the use of acid binding agents in O.E. Schulty, Arch. Pharm. 295, pp. 146–151 (1962) and the reaction of amines with dialkylthiocarbamoyl halides in J.Chem.Soc. 30, p. 2465 (1965); and the production from isocyanates and phosphorus pentasulfide in Houben-Weyl, 4th Ed., Vol. 9, p.867 et seq. The novel compounds formulas I and II are stable in water and readily soluble in the conventional organic solvents.

The compositions according to the invention can contain, for example, the active substances of general formulas I and II the preparation of which is described in the following non-limitative examples. Parts and percentages are given therein by weight unless expressly stated otherwise. Temperatures are in degrees Centigrade; 1 Torr = 1 mm Hg.

EXAMPLE 1

A suspension of 23 parts of 4-nitro-4'-amino-diphenyl ether in 100 parts by volume of water is added within about 60 minutes to a well stirred emulsion of 15.4 parts of thiophosgene in 30 parts by volume of ice-water. The temperature of the reaction mixture is kept at 10°–15° by ice cooling. On completion of the addition, the mixture is stirred for 12 hours at room temperature, the precipitate formed is then separated by suction filtration and the residue is washed neutral with water. After drying in vacuo at 60°, the residue is dissolved in 20 parts by volume of acetone adding animal charcoal, and the 4-nitro-4'-isothiocyanodiphenyl ether crystallizes. Yield rate: 80 percent of the theoretical. M.P. 124°–125°.

EXAMPLE 2

27.1 parts of 3-diethylamino-2',4'-diamino-diphenyl ether are added in portions to a well stirred emulsion of 30.8 parts of thiophosgene in 90 parts by volume of ice water, the addition being made in batches within 2 hours. The temperature is prevented from rising above 15° by ice cooling. On completion of the addition, the mixture is stirred for 12 more hours at room temperature, the precipitate formed is separated by filtration, washed well with cold water, separated and dried in vacuo. The filter residue is digested with ether and filtered off. 32.2 parts of 3-diethylamino-2',4'di-isothiocyano-diphenyl ether hydrochloride are obtained. Yield rate: 90.5 percent of the theoretical. M.P. 181°–182°.

EXAMPLE 3

Example 1 is repeated, but as starting reactants there are used 24.6 parts of 4-nitro-4'-amino-diphenyl sulfide and 15.4 parts of thiophosgene in 30 parts by volume of ice water. 22.1 parts of 4-nitro-4'-isothiocyano-diphenyl sulfide having a melting point of 127°–128° are obtained.

EXAMPLE 4

25.6 parts of 4-nitro-4'-isocyano-diphenyl ether having a melting point of 116°–118° are mixed with 200 parts by volume of o-dichlorobenzene and 7.5 parts of phosphorus pentasulphide and boiled for 14 hours under reflux. After cooling to room temperature, slimy precipitate formed is separated by filtration. 200 parts of 50°-hot water are added to the filtrate, after 10 minutes of stirring animal charcoal is added, and the whole is then filtered.

The organic phase is separated from the aqueous phase and the latter is extracted again with 50 parts by volume of o-dichlorobenzene. The combined organic extracts are washed successively with water, aqueous sodium dicarbonate solution and again water. After drying over calcium chloride, the solvent is removed by heating to 100° in vacuo, the resulting crystalline residue is digested with petroleum ether and filtered. 20 parts of crude 4-nitro-4'-isothiocyano-diphenyl ether having a melting point of 110°–120° are obtained. After fractionated recrystallization from diethyl ether petroleum ether, the pure substance having a melting point of 121°–123° is obtained. A mixture of a sample of this substance with a sample of the substance obtained according to Example 1 shows the same melting point.

EXAMPLE 5

Twenty parts of 4-nitro-2'-amino-diphenyl sulphone are added in portions within 60 minutes to a well stirred emulsion of 11.1 parts of thiophosgene in 120 parts by volume of ice water. The temperature is kept at 10°–12° by ice cooling. On completion of the addition, the mixture is stirred for 20 more hours at room temperature. The pale grey precipitate formed is separated by suction filtration, washed neutral with water, dried in vacuo, digested with ether and filtered under suction. 18.6 parts of 4-nitro-2'-isothiocyano-diphenyl sulphone are obtained.

EXAMPLE 6

26.2 parts of 4-nitro-2'-amino-diphenyl sulphoxide are added in portions within 2 hours to a well stirred emulsion of 15.4 parts of thiophosgene in 100 parts by volume of ice water. The temperature is kept at 8°–14° by ice cooling.

On completion of the addition, the mixture is stirred for 12 more hours at room temperature, the precipitate formed is separated by suction filtration and washed neutral with water. After drying in vacuo, the residue obtained is recrystallized from acetone with the addition of animal charcoal. 15 parts of 4-nitro-2'-isothiocyano-diphenyl sulphoxide are obtained. Yield rate: 56 percent of the theoretical. M.P. 116°–117°.

In an analogous manner the following compounds of formula I can be prepared from the correspondingly substituted starting amino-diphenyl ethers, sulfides sulfoxides and sulfones:

7. 2-nitro-2'-isothiocyano-diphenyl ether
8. 4-nitro-4'-isothiocyano-diphenyl sulfoxide
9. 3-nitro-4-isothiocyano-diphenyl ether
10. 2-nitro-4'-isothiocyano-diphenyl sulfoxide
11. 4-nitro-2',4'-di-isothiocyano-diphenyl ether
12. 4-nitro-3'-chloro-4'-isothiocyano-diphenyl ether
13. 3-nitro-4-isothiocyano-4'-methyl-diphenyl ether
14. 3-nitro-4-isothiocyano-4'-methoxy-diphenyl ether
15. 2,4'-di-isothiocyano-5-nitro-diphenyl ether
16. 2-nitro-2'-isothiocyano-diphenyl sulfide
17. 4-nitro-4'- isothiocyano-diphenyl sulfone
18. 3-nitro-4,4'-di-isothiocyano-diphenyl ether
19. 3-nitro-4-isothiocyano-4'-methyl-diphenyl sulfide
20. 2-nitro-4-isothiocyano-diphenyl sulfoxide
21. 2-nitro-4-isothiocyano-diphenyl sulfone.

Anthelmintic compositions, including feed additives which contain as active ingredients the compounds of the general formula I or the salts thereof which are non-toxic to the organism, especially of mammals and birds, can be administered directly to animals in the form of solutions, emulsions, suspensions, drenches, powders, tablets or boluses or in the form of gelatin capsules, or they can be admixed to their feed.

The active substances can be administered to helminth-infested animals or to animals to be protected against helminths in the form of therapeutical preparations either as one single dose or repeatedly, the single dosage, depending on the type of animal, preferably between 25 and 1,000 mg per kg bodyweight.

In some cases better results are obtained or the total amount required for a cure can be decreased by protracted administration. The concentration in which the active substances in the form of such agents are added, e.g. to feeds or liquids given to animals are between 0.05 and 1 percent by weight.

To prepare the forms of application given above, conventional solid carriers can be used, for example kaolin, talcum, bentonite, sodium chloride, calcium phosphate, hydrocarbons, cellulose powder, carbowaxes, gelatins, or liquids such as water, if desired with the addition of surface active agents, ionic or nonionic dispersing agents or emulsifying agents, oils and other solvents which do not injure the animal organism.

The new compounds according to the invention can also be added in solid form to the animals' feed. Suitable carrier materials in feed concentrates (feed additives) are, among others and in addition to those mentioned above, energy-producing feed, grain feed, protein concentrates, fish meal, soya-bean meal, cotton seed meal and linseed meal. Such a concentrate, usually having a concentration of about 25 percent by weight of active substance, is then thoroughly mixed with other conventional feed additives or fillers, such as mineral agents, vitamins, antibiotics, chemotherapeutics, bacteriostatics, fungistatics, coccodiostatics, hormone preparations, substances having an anabolic action or other substances which promote growth, influence the quality of the meat of animals to be slaughtered or are useful to the animal organism in any other way. In this manner, a "premixture" (feed additive) is obtained which contains, e.g. 5–10 percent by weight of the active substance of the general formula I. A suitable amount of this premixture is then equally distributed by means of a mixer in a usual commercial food such as a grain mixture or other vegetable or animal substances. The finished feed contains the substances of formula I preferably in a concentration of about 0.05–1 percent by weight.

Tests performed on various animals suffering from helminthiasis are described below. As has been shown in the tests on hens infested with Ascaridia galli, the active substances of general formula I are well tolerated by the animal organism and are substantially less toxic than allyloxyphenyl - and butyloxyphenyl-isothiocyanate.

In these tests, the figures given in the first column of subsequent tables designate the following compounds:
1. 4-nitro-4'-isothiocyano-diphenyl ether
2. 4-nitro-3'-chloro-4'-isothiocyano-diphenyl ether
3. 3-diethylamino-2',4'-di-isothiocyano-diphenyl ether hydro-chloride
4. 2-nitro-2'-isothiocyano-diphenyl sulfide
5. 4-nitro-2'-isothiocyano-diphenyl sulfoxide
6. 4-nitro-4'-isothiocyano-diphenyl sulfide
7. 3-nitro-4-isothiocyano-diphenyl ether
8. 3-nitro-4-isothiocyano-4'-methoxy-diphenyl ether
9. 3-nitro-4-isothiocyano-4'-methyl diphenyl ether.
10. 3-allyloxy-phenyl-isocyanate (known from the German Pat. No. 852 087)
11. 4-n-butyloxy-phenyl-isocyanate (known from the German Pat. No. 852 087)

1. Test on Hens Infested with Ascaridia Galli

About two-day-old chickens were artificially infected with Ascaridia galli via an esophagal sound, for each chicken 300 embrionized eggs suspended in 2 milliliters (ml) of a thin aqueous oatmeal suspension. A group of five chickens was used in each test. After a period of five weeks, at which time the chickens had an average weight of about 400 grams each, the active substances were administered to the animals once a day, over a period of three days. For the purpose of administration, the amount of active substance used as daily dose, ranging from 200 up to 1,000 milligrams per kilogram of bodyweight of the chickens, was suspended in 2 ml of thin aqueous oatmeal suspension. Simultaneously infected but untreated chickens were used as controls.

Evaluation

The number of Ascaridia galli eliminated by each test group within a five-day period following the first day of administration of the active substance was recorded daily, and the number of worms found in the intestine upon dissection of those chickens still infected with worms on the fifth day of the test was added. Furthermore, the number of chickens without worms was determined.

The results are given in Table I below.

In this and all subsequent tables, a single "O" in Column 6 states that all 5 chickens of a series were free of helminths. Where five numbers are given, they refer to the number of worms found in each of the five chickens of a group upon dissection. Numbers in parenthesis are the numbers of worms found in the respective control group.

The second number in the column showing the daily dosage states the number of successive days during which this dosage was applied.

TABLE I

| active substance | Test group | Total daily dose (mg/kg) following application | Ascaridia galli eliminated from 5 hens in 5 days | | number of worms found in intestines upon dissection | general condition of hens |
|---|---|---|---|---|---|---|
| | | | absolute number | in % of the total number of worms | | |
| 1 | first | 500/ 3 days | 141 | 100 | 0 | good |
| 1 | second | 250/ 3 days | 269 | 100 | 0 | good |
| 2 | | 500/ 3 days | 74 | 100 | 0 | good |
| 8 | | 750/ 3 days | 288 | 92 | 0;0;0; 15;9 | all five good |
| 10 | first | 500/ 3 days | 70 | 27 | 65;37; 74;11;0 | 3 dead, 2 apathetic, |
| 10 | second | 500/ 3 days | 70 | 0 | | 4 dead |
| 10 | third | 250/ 3 days | 53 | 35 | | apathetic |
| 11 | | 500/ | 187 | 94 | 0;0;0;1;10 | 3 apathetic |

II. Tests on White Mice Infested with Hymenolepis Nana (Tapeworm)

Groups of white mice, each consisting of five animals having an average bodyweight of 23 grams (g) and being artificially infested with Hymenolepis nana, were given daily, for the number of days stated in the second column of Table II, infra, 0.4 milliliter, per animal, of a suspension of the test substances stated in the first column of Table II, in adequate concentration to afford the daily dose stated in the second column of the said table.

For each test substance, a group of five mice was used, together with a control group of equally tapeworm-infested mice which were not given any test substance.

On the sixth day of the test, the test and control animals were sacrificed and dissected and their intestines examined for remaining tapeworms.

A single "O" in the third column of Table II indicates that all five test animals of the respective group were free from Hymenolepis nana. Where at least one animal of a group still showed the presence of worms, data for all five animals are given. The same applies to all control groups.

All test animals with the exception of those treated with substances Nos. 10 and 11, tolerated the test substances well without showing any abnormal symptoms.

TABLE II

| test compound | daily dose/ (number of days) | infestation of test animals on 6th | infestation of controls on 8th day |
|---|---|---|---|
| 1 | (750 mg/kg)/ (3 days) | 0 | 4; 7; 22; 6; 6 |
| 6 | (600 mg/kg)/ (3 days) | 0 | 6;6;11;20;7 |
| 3 | (750 mg/kg)/ (3 days) | 0 | 18;19;35; 8;18 |
| 5 | (100 mg/kg)/ (3 days) | 0 | 3; 3; 2; 5; 11 |
| 7 | (750 mg/kg)/ (3 days) | 0;0;0;0;1 | 5;12;11;4;2; |
| 9 | first: (750 mg/kg)/ (2 days) then: 375 mg/kg)/ (1 day) | 0 | 2;2;3;5;3; |
| 10 | (200 mg/kg)/ (1 day) | all 5 mice dead | 14;23;3;1;10 |
| 11 | (750 mg/kg)/ (1 day) | all 5 mice dead | 5;8;9;6;11 |

III. Tests on Rats Infested with Liver Fluke carried

While laboratory rats were infested artificially with liver fluke (Fasciola hepatica) which is for instance found in sheep and goats. After the pre-patency period was over, infestation of the rats with the fluke was checked for the fluke eggs by three analyses of faeces, carried out independently of each other.

Two infested rats were used per test substance; the latter was introduced in the form of a suspension through an esophagal sound, once daily on three successive days. In the third to fifth week after application of the test substance, an analysis of faeces to determine the presence of liver fluke eggs was carried out once every week. At the end of the fifth week counting from the beginning of the test, the test animals were sacrificed and checked for the presence of surviving flukes. The rats tolerated the test substances of the invention without showing any abnormal symptoms. The results are shown in Table III, infra.

TABLE III

| Test Substance | daily dose mg/kg bodyweight | Analysis of faeces to test for presence of eggs | | Number of liver flukes found at necropsy of rats treated with test substance |
|---|---|---|---|---|
| | | 3 times prior to medication | 3 times after medication | |
| 1 | 50 | positive | negative | 0 |
| 1 | 200 | " | " | 0 |
| 5 | 50 | " | " | 0 |
| 6 | 200 | " | " | 0 |
| 11 | 100 | " | " | both rats died on the 5th day |

IV Tests on Oxyuridae-infested White Mice

Groups of white mice, each consisting of five animals having an average bodyweight of 23 grams (g) and being naturally infested with oxyuridae (Syphacia obvelata), were given daily, for the number of days stated in the second column of Table IV, infra, 0.4 milliliter, per animal, of a suspension of the test substances stated in the first column of Table IV, in adequate concentration to afford the daily dose stated in the second column of the said table.

For each substance, a group of five mice was used, together with a control group of equally oxyuridae-infested mice which were not given any test substance.

On the sixth day of the test, the test and control animals were sacrificed and dissected and their intestines examined for remaining oxyuridae as well as for old and young oxyurida larvae.

A single "O" in the third column of Table IV indicates that all five test animals of the respective group were free from oxyuridae and from their larvae. LL means infestation with old and young larvae, oL means infestation with old larvae only, and yL means infestation with young larvae only. Where at least one animal of a group still showed the presence of larvae, data for all five animals are given. The same applies to all control groups.

All test animals tolerated the test substances of the invention, without showing any abnormal symptoms.

TABLE IV

| Test Compound | (Daily Dosage)/ (Number of Days) | Infestation of Test Animals on 6th day | Infestation of Controls on 8th day |
|---|---|---|---|
| 1 | (750 mg/kg)/ (3 days) | 0 | 11/oL;17/LL;2;62/LL; 48/LL |
| 3 | (750 mg/kg)/ (3 days) | 0;0;0;0;0/yL | 12;20/LL;6/LL;4;6/LL |
| 4 | (750 mg/kg)/ (2 days) | 0 | 2;0;1/oL;37/LL;18 |
| 10 | (750 mg/kg)/ (3 days) | all 5 mice dead | 17/LL; 6/oL; 45/LL; 30/oL; 2 |
| 11 | (750 mg/kg)/ (1 day) | all 5 mice dead | 2; 4/oL; 7/oL; 21/LL; 17/LL; 34/LL. |

The following non-limitative examples are given for the production of forms of application of anthelmintically effective veterinary-medical preparations and feed additives.

Parts and percentages are given therein by weight.

EXAMPLE I

A wettable powder is produced by thoroughly milling and mixing 50 parts of 4-nitro-4'-isothiocyano-diphenyl ether, 30 parts of a synthetic calcium silicate (Microcell), 19.5 parts of kaolin and 0.5 parts of a solid condensation product obtained from ethylene oxide and propylene oxide having a molecular weight of about 8,000, having a central block of propylene polymer of an average molecular weight of about 1,500 flanked on each side by ethylene oxide polymer (for example the commercially available "Pluronics F 68"). When this mixture is stirred with water, a pulpy concentrate is obtained which is particularly suitable for administration to pets and domestic animals

EXAMPLE II

1 Part of 4-nitro-4'-isothiocyano-diphenyl ether is carefully mixed with 19 parts of sodium chloride and this mixture is administered to the animals in such amounts that a daily dosage of 50–1,000mg active substance per kg bodyweight is taken up. Such salt mixtures can also be incorporated into boluses or gelatin capsules and administered to the animals as such.

EXAMPLE III

Fifty Parts of 4-nitro-4'-isothiocyano-diphenyl thioether are thoroughly mixed with 0.8 parts of sodium benzoate, 2 parts of a tylose kaolin mixture (1:1), 0.05 parts of sodium lauryl sulphate, 5 parts of sorbitan monooleate and 42.15 parts of white flour to form a 50 percent concentrate which can be dispersed in any concentration desired e.g. in water or milk.

EXAMPLE IV

Fifty Parts of 4-nitro-4'-isothiocyano-diphenyl ether are thoroughly mixed with 0.8 parts of sodium benzoate, 2 parts of tylose, 5 parts of sorbitan monooleate and 42.2 parts of white flour to form a 50 percent concentrate which can be dispersed in any concentration desired, e.g. in water or milk. If such a suspension is fed to growing pets and domestic animals, the rate of their gain in weight is greater than that of control animals.

EXAMPLE V

Ten Parts of 4-nitro-4'-isothiocyano-diphenyl ether are thoroughly mixed with 90 parts of a concentrated feed meal which is well balanced with regard to its nutritional content. The concentrated feed meal consists of:

| | |
|---|---|
| roughage | 4.5% |
| crude protein | 18.5% |
| digestible protein | 15.7% |
| total nutrients | 66.5% |
| vitamin A | 9000 i.U/kg |
| vitamin $D_3$ | 1200 i.U/kg |
| vitamin $B_2$ | 6 mg/kg |

The feed additive can be fed to pigs and sheep as such in a measured quantity or can be included in a 0.05 – 1 percent admixture (weight content of active substance) in the normal feed. Higher doses are administered over a shorter time, lower doses are given over a more extended time. The general condition of the animals is improved and simultaneously, a better rate of weight gain is attained.

EXAMPLE VI 4-nitro-4'-isothiocyano-diphenyl ether is intimately blended with a feed containing:

| | |
|---|---|
| roughage | 4–5% |
| crude protein | 18–20% |
| total nutrients | 67–70% |
| vitamin A | 12000 i.U/kg |
| vitamin $D_3$ | 1500 i.U/kg |
| vitamin $B_2$ | 8 mg/kg | to form a 0.05 – 0.5 percent active substance containing feed mixture. This mixture is specially suited for feeding fowls.

EXAMPLE VII 4-nitro-4'-isothiocyano-diphenyl ether is triturated with dextrin or sugar to form a 20 percent concentrate. 1 g of this mixture is dissolved in 1 liter of full cream milk. This solution is given to 10–20 days old calves once daily for 4 weeks. The calves fed in this way with 200 mg of active substance per liter of milk showed a better increase in weight than those which received no additive in the milk.

EXAMPLE VIII 4-nitro-4'isothiocyanodiphenyl ether is finely ground with a previous sieved feed of the compositions:

| | |
|---|---|
| roughage | 4–6% |
| crude protein | 18–20% |
| total nutrients | 67–70% |
| vitamin A | 4000 i.U/kg |
| vitamin $D_3$ | 600 i.U/kg | to form a 5 percent substance-containing concentrate. Portions of this mixture were mixed with a commercial pig meal and fed to young pigs so that each animal at each feed received 100 mg of active substance per kilogram of pig meal.

The test groups each containing 5 young pigs showed greater increase in weight than the control animals.

EXAMPLE IX

A poultry feed of the following composition is prepared:

| | |
|---|---|
| basic feed | |
| semolina | 220 g |
| coarsely ground maize | 220 g |
| coarsely ground barley | 80 g |
| groats | 60 g |
| suet | 50 g |
| codfish meal | 100 g |
| fish meal | 30 g |
| skimmed milk powder | 20 g |
| soya cake | 100 g |
| sunflower cake | 70 g |
| peanut cake | 30 g |
| bone meal | 5 g |
| calcium carbonate | 10 g |
| sodium chloride | 3 g |
| milled sand | 2 g |
| | 1000 g |

The following additives are added to this basic feed per kilogram:

| | |
|---|---|
| lysine | 500 mg |
| bacitracin zinc salt | 20 mg |
| nitrofurazone | 125 mg |
| trace elements: Fe | 10 mg |
| Cu | 1 mg |
| Mn | 50 mg |
| I | 1.5 mg |
| Zn | 8 mg |
| vitamin B$_1$ | 1.5 mg |
| vitamin B$_2$ | 4 mg |
| vitamin B$_6$ | 2 mg |
| vitamin B$_{12}$ | 10 mg |
| nicotinic acid | 10 mg |
| choline | 25 mg |
| pantothenic acid | 10 mg |
| folic acid | 0.5 mg |
| | 778.5 mg |
| vitamin A | 12,000 i.U. |
| vitamin D$_3$ | 1,000 i.U. |
| vitamin E | 10 i.U. |

300 mg of 4-nitro-4'-isothio-cyano-diphenyl ether were then added per kg to the above feed mixture and a group of white leghorn chickens of an initial weight of about 250 g were fed with this mixture for 6 weeks. Compared with a control group over the same period, the average increase in weight was about 7 percent.

Similarly effective compositions are obtained when replacing in the above Examples I to IX, the respective amounts of 4-nitro-4'-isothiocyano-diphenyl ether by identical amounts of each of the compounds designated 2 to 6 inclusive, or another of the compounds according to the invention described in Examples 1 to 58.

We claim:

1. A compound of the formula

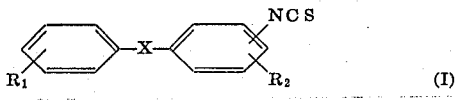

(I)

wherein
R$_1$ is nitro or di-lower alkyl-amino,
R$_2$ is hydrogen, chlorine or isothiocyano, and
X is —O—, —S—, —SO— or —SO$_2$.

2. A compound according to claim 1, which is 4-nitro-4'-isothiocyano-diphenyl ether.
3. A compound according to claim 1, which is 3-diethylamino-2',4'-di-isothiocyano-diphenyl ether.
4. A compound according to claim 1, which is 2-nitro-2'-isothiocyano-diphenyl sulfide.
5. A compound according to claim 1, which is 4-nitro-2'-isothiocyano-diphenyl sulfoxide.
6. A compound according to claim 1, which is 4-nitro-4'-isothiocyano-diphenyl sulfide.
7. A compound according to claim 1, which is 2-nitro-4'-isothiocyano-diphenyl sulfoxide.
8. A compound according to claim 1, which is 4-nitro-3'-chloro-4'-isothiocyano-diphenyl ether.
9. A compound of the formula

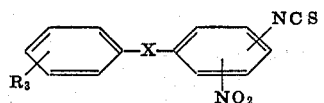

wherein
R$_3$ is hydrogen, lower alkyl, lower alkoxy, or isothiocyano, and
X is —O—, —S—, —SO— or —SO$_2$—.

10. A compound according to claim 9 which is 3-nitro-4-isothiocyano-diphenyl ether.
11. A compound according to claim 9, which is 3-nitro-4-nitrothiocyano-4'-methoxy-diphenyl ether.
12. A compound according to claim 9, which is 3-nitro-4-isothiocyano-4'-methyl-diphenyl ether.

* * * * *